United States Patent [19]

Adam et al.

[11] 4,406,046

[45] Sep. 27, 1983

[54] PROCESS FOR THE PRODUCTION OF A SODIUM-FILLED VALVE

[75] Inventors: Peter Adam, Dachau; Horst Meyer-Spradow, Adelebsen; Lothar Reisinger, Dachau, all of Fed. Rep. of Germany

[73] Assignee: MTU Motoren- und Turbinen-Union Munchen, GmbH, Fed. Rep. of Germany

[21] Appl. No.: 184,110

[22] Filed: Sep. 4, 1980

[30] Foreign Application Priority Data

Sep. 8, 1979 [DE] Fed. Rep. of Germany ....... 2936355

[51] Int. Cl.³ .......................... B23P 15/00; F01L 3/14
[52] U.S. Cl. .......................... 29/156.7 C; 123/188 A; 219/121 EG; 53/408; 53/432
[58] Field of Search ...... 29/156.7 C; 53/432, 53/510, 404, 408; 123/188 A, 188 AA; 219/121 EB, 121 EC, 121 ED, 121 EF, 121 EG, 121 EN; 228/112

[56] References Cited

U.S. PATENT DOCUMENTS

| | | | |
|---|---|---|---|
| 2,157,610 | 5/1939 | Jardine | 29/156.7 C |
| 2,365,285 | 12/1944 | McDill | 29/156.7 C |
| 2,367,756 | 1/1945 | Cummings | 29/156.7 C |
| 2,814,382 | 11/1957 | Lassiter | 53/408 |
| 2,997,397 | 8/1961 | Dougheridis | 53/432 |
| 3,710,773 | 1/1973 | Piech et al. | 29/156.7 C |
| 4,069,978 | 1/1978 | El Moussa | 219/121 EC |

FOREIGN PATENT DOCUMENTS

| | | | |
|---|---|---|---|
| 763951 | 5/1954 | Fed. Rep. of Germany | 53/404 |
| 2324850 | 12/1974 | Fed. Rep. of Germany | 123/188 AA |
| 279227 | 10/1927 | United Kingdom | 53/404 |
| 393268 | 5/1933 | United Kingdom | 53/404 |
| 471605 | 9/1937 | United Kingdom | 123/188 AA |
| 1236126 | 6/1971 | United Kingdom | 228/112 |

*Primary Examiner*—Daniel C. Crane
*Attorney, Agent, or Firm*—Scully, Scott, Murphy & Presser

[57] ABSTRACT

A process for the production of a sodium-filled valve in which the sodium is introduced into a hollow valve stem through a filling bore of relatively large diameter and which is sealed through a plug and/or usual welding. Subsequent to the closing off of the filling bore, the hollow inner space is evacuated through a passageway having a small cross-section and is thereafter sealed vacuum-tightly in a vacuum through either welding or soldering. Through the evacuation of the hollow space there is avoided any kind of oxydation of the sodium and thereby any change. Moreover, no froth or foam formation is encountered so as to facilitate the presence of an extremely constant heat transfer.

2 Claims, 3 Drawing Figures

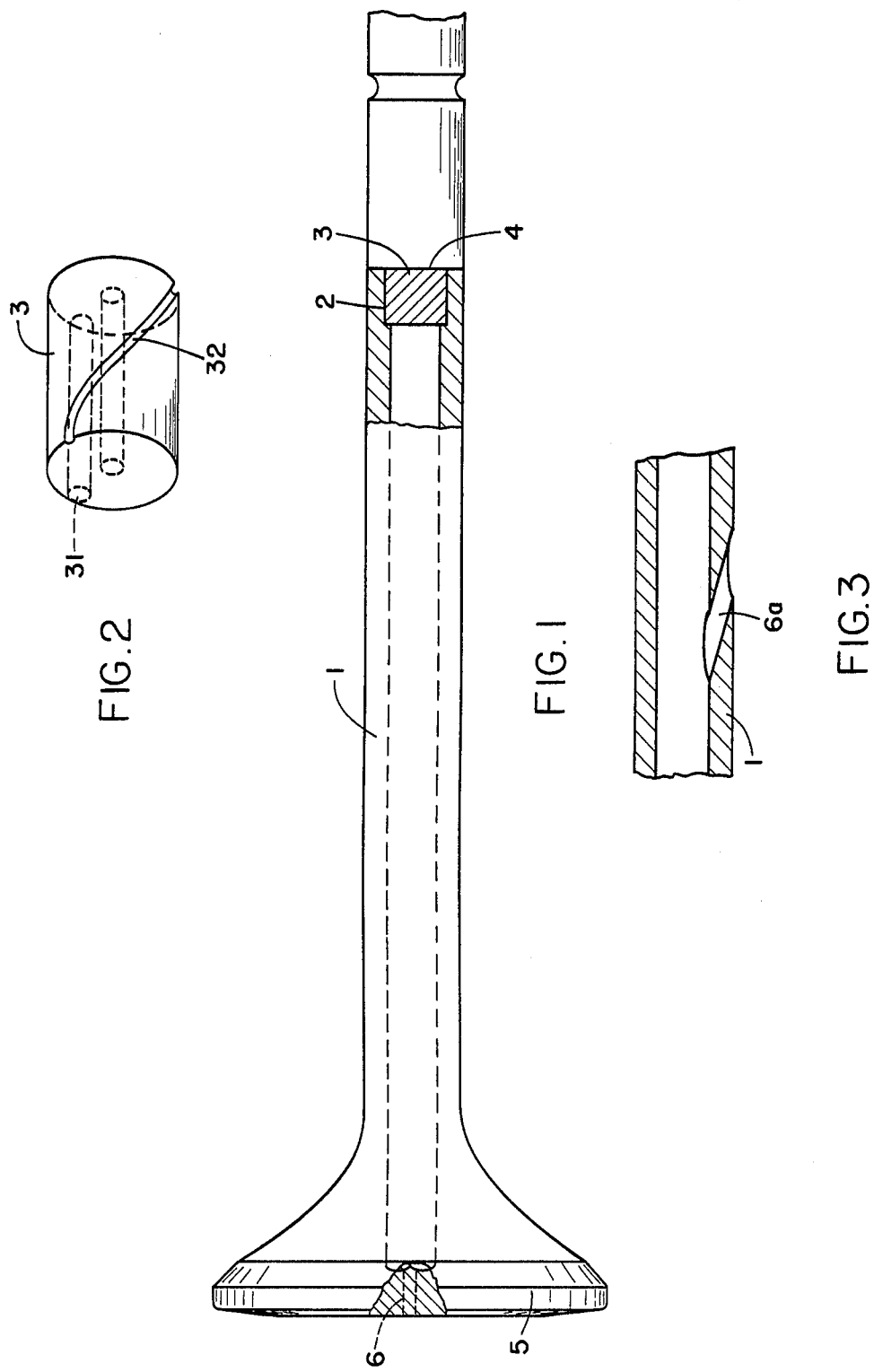

4,406,046

PROCESS FOR THE PRODUCTION OF A SODIUM-FILLED VALVE

BACKGROUND OF THE INVENTION

1. Field of the Invention

The present invention relates to a process for the production of a sodium-filled valve in which the sodium is introduced into a hollow valve stem through a filling bore of relatively large diameter and which is sealed through a plug and/or usual welding.

2. Discussion of the Prior Art

The purpose of such a sodium filling of valves, particularly of such fillings for piston engines, is to provide an improved heat transfer from the thermally highest loaded valve head as a result of the extraordinarily superior heat conductivity of the sodium. However, due to the high thermal expansion of the sodium, the hollow-bored valve stem cannot be completely filled with sodium, but only up to about 80%. The remaining empty space within the hollow valve stem contains ambient air which, during the operation of the valve, leads to the frothing and corrosion of the sodium; thereby leading to an unstable heat conduction, as well as adversely affecting the heat transfer.

SUMMARY OF THE INVENTION

Accordingly, it is an object of the present invention to obviate the disadvantages encountered in the prior art and to provide a novel process through which the residual air remaining in the valve steam is eliminated without complication of the process.

In order to attain the object of this invention, the process is characterized in that, subsequent to the closing off of the filling bore, the hollow inner space is evacuated through a passageway having a small cross-section and is thereafter sealed vacuum-tightly in a vacuum through either welding or soldering. Through the evacuation of the hollow space there is avoided any kind of oxydation of the sodium and thereby any change. Moreover, no froth or foam formation is encountered so as to facilitate the presence of an extremely constant heat transfer.

In a first embodiment of the inventive process the passageway of small cross-section is located in the valve head. An advantage is achieved hereby is that during the production of the small cross-sectioned passageway, as well as upon the subsequent sealing, no thermal or mechanical loads will act on the already previously closed filling bore.

A further embodiment of the process contemplates the small cross-sectioned passageway as a linear or threadshaped groove in the sealing surface of a filter plug or in the filling bore. Thus, in this embodiment the filling bore is closed off through a filler closure plug and, by means of subsequent welding, the filler closure plug is welded together with the valve stem, as well as concurrently there is sealed the evacuation passageway.

In a further modified embodiment of the invention, the small cross-sectioned passageway is provided as an axial bore in a filler closure plug. Finally, the small cross-sectioned passageway can also be a bore extending through the wall of the valve stem and which is inclined relative to the longitudinal axis of the valve stem.

A preferred embodiment contemplates the process in the sealing of the small cross-sectioned passageway through the application of electron beam welding. The utilization of the electron beam welding for the sealing of the hollow space provides a particularly simple and fortuitous solution to the problem since through the electron beam welding a small cross-sectioned passageway, as is necessary for the evacuation, can be closed off rapidly and without problems and, concurrently, there will be automatically effected the evacuation of the hollow space itself within the framework of this electron beam welding in the vacuum chamber of the electron beam welding apparatus.

In one of the preferred embodiments of the process pursuant to the invention, the electron beam is arcuately conveyed about the bore during the electron beam welding. Achieved hereby is that the bore of the small diameter will melt together without the electron beam through the bore being able to impinge against the sodium found in the interior of the hollow space. Such an impingement of the electron beam against the sodium would inherently create the danger that the sodium vaporizes so as to generate vapor pressure in the hollow space during the melting together of the small-diameter bore, and which can cause the material melt present to be pressed out.

Furthermore, it is advantageous when, during boring and/or sealing off the small-cross-sectioned passageway, the valve is brought into such a position wherein the sodium is remote from the passageway. Also in this manner, it is quite possible to avoid heating of the sodium.

Finally, it has been evidenced that the small-cross-sectioned passageway preferably have a cross-section of about 1 mm$^2$ in order to effectuate the process with the best results.

Additionally, the inventive process can finally also be carried out in the manner wherein the hollow space is evacuated above a passageway of small cross-section and is then vacuum-tightly sealed, in that an extension is attached to the valve stem through friction welding, whereby the friction welding is effected under a vacuum bell jar. This embodiment is of significance in that in hollow valves there must frequently be attached a solid stem end which includes retaining grooves for the fastening of the valve springs. Such solid stem end pieces are then attached in a usual manner to the end of the hollow valve stem by means of friction welding or flash welding, wherein it can be advantageous to effectuate this welding procedure in a vacuum end to thereby concurrently evacuate the hollow space of the valve stem.

BRIEF DESCRIPTION OF THE DRAWINGS

Reference may now be had to the following detailed description of several preferred embodiments of the invention, taken in conjunction with the accompanying drawings; in which:

FIG. 1 is a longitudinal, partly sectioned view of a sodium-filled poppet valve;

FIG. 2 perspectively illustrates a filler closure plug for a poppet valve pursuant to FIG. 1; and FIG. 3 is a fragmentary longitudinal sectional view through the valve stem of a poppet valve pursuant to FIG. 1 in a specialized construction.

DETAILED DESCRIPTION

In FIG. 1 the stem of the valve is designated by reference numeral 1. This valve stem 1 is bored hollow and, to a large extent, filled with sodium. A filling bore 2 is located at the rear stem end, and is closed off with a closure plug 3 which is welded together with the valve stem 1, preferably at the location 4. The hollow space of the valve stem 1 is drilled into with a small-diameter bore which is centrally located in the valve head or poppet 5. This small-cross-sectioned passageway 6 (shown in dashed lines) is again closed off through electron beam weldings. The electron beam is arcuately conveyed about the bore 6 during the electron beam welding. With this arrangement the bore 6 of the small diameter will melt together without the electron beam through the bore being able to impinge against the sodium found in the interior of the hollow space.

The filler closure plug 3 shown in perspective FIG. 2 illustrates three different possibilities of arranging an evacuation passageway. In a first embodiment (shown in solid lines) the small cross-sectioned passageway is a helical groove 32 in the sealing surface of the filler closure plug 3. A second embodiment (shown in dash lines) shows the small cross-sectioned passageway as a straight or linear groove 31, whereas a third embodiment shows the small cross-sectioned passageway as a central bore through the filling closure plug 3.

The section of a valve stem 1 illustrated in FIG. 3 shows a further alternate arrangement for an evacuation passageway. The evacuation passageway is hereby constructed as a bore 6a extending through the wall of the valve stem inclined relative to the longitudinal axis of the valve stem 1.

What is claimed is:

1. In a process for the production of a sodium-filled valve having a hollow valve stem, including introducing the sodium into the hollow valve stem through a filling bore of relatively large diameter in the valve stem end of the sodium-filled valve and then sealing said bore; the improvement comprising: evacuating the hollow space of said valve stem through a small cross-sectioned passageway through the head of the sodium-filled valve, at an opposite end from the valve stem end, subsequent to the sealing of said filling bore; positioning said valve during a sealing of said passageway so as to locate the sodium remote from said passageway; and thereafter sealing said passageway through electron beam welding vacuum-tightly in a vacuum by conveying the electron beam about said small cross-sectional passageway thereby causing the small cross-sectional passageway to melt together without the electron beam impinging on the sodium, and said step of sealing said bore including the step of welding the bore by a welding process in a separate step prior to said steps of evacuating and electron beam welding.

2. Process as claimed in claim 1, said step of evacuating through a small cross-sectioned passageway including the step of evacuating through a passageway having a cross-section of about 1 mm$^2$.

* * * * *